United States Patent [19]

Carroll

[11] Patent Number: 6,123,871
[45] Date of Patent: Sep. 26, 2000

[54] PHOTOLUMINESCENCE POLYMERS, THEIR PREPARATION AND USES THEREOF

[76] Inventor: Michael Lee Carroll, 3231 SW. 104th Ave., Miama, Fla. 33165

[21] Appl. No.: 09/227,868

[22] Filed: Jan. 11, 1999

[51] Int. Cl.$^7$ .......................... C09K 11/02; C09K 11/64; C09K 11/55
[52] U.S. Cl. ............................. 252/301.36; 282/301.4 R; 524/503; 524/557; 524/437; 524/803
[58] Field of Search .................. 252/301.4 R, 301.3 C; 524/503, 357, 437, 803

[56] References Cited

U.S. PATENT DOCUMENTS

| | | |
|---|---|---|
| 4,634,395 | 1/1987 | Burchett . |
| 5,244,429 | 9/1993 | Sinclair et al. . |
| 5,424,006 | 6/1995 | Yoshihiko et al. . |
| 5,453,624 | 9/1995 | Sailor et al. . |
| 5,552,667 | 9/1996 | Cho et al. . |
| 5,580,655 | 12/1996 | El-Shall et al. . |
| 5,591,890 | 1/1997 | Jenecke . |
| 5,607,621 | 3/1997 | Ishihara et al. . |
| 5,665,793 | 9/1997 | Anders . |
| 5,674,437 | 10/1997 | Geisel . |
| 5,686,022 | 11/1997 | Murayama et al. . |
| 5,770,111 | 6/1998 | Aokt et al. . |

*Primary Examiner*—C. Melissa Koslow

[57] ABSTRACT

Photoluminescence polymers, processes for preparing these novel photoluminescence polymers and methods for their use are provided. The photoluminescence polymers having one or more photoluminescence pigments dispersed in an aqueous solution of polyvinyl alcohol in the ratios from about 2:1 to 1:5 by weight. These novel photoluminescence polymers are moldable, non-toxic, non-radioactive, environmentally safe and have been found to be potent photoluminescence polymers that provide a bright after glow for extended periods of time up to 10 hours or more.

16 Claims, No Drawings

PHOTOLUMINESCENCE POLYMERS, THEIR PREPARATION AND USES THEREOF

BACKGROUND OF THE INVENTION

1. Field of the Invention

The present invention relates generally to the composition of photoluminescence polymers, the process for making and the methods of use.

More particularly, the present invention relates to the composition of novel photoluminescence polymers that provide extremely long afterglow characteristics. The novel composition contains known moisture sensitive photoluminescence pigments and a polyvinyl alcohol polymer which is water soluble, and which imparts moisture stability to the photoluminescence pigment. The resulting photoluminescence polymers are capable of repeating the light-absorption/light-emission cycle numerous times.

Further, the present invention relates to the method of preparing the novel photoluminescence polymers by combining photoluminescence pigments and polyvinyl alcohol under specific conditions.

Additionally, the present invention relates to the methods of using of these photoluminescence materials.

2. Description of the Prior Art

Products providing glow in the dark or fluorescence properties are well known in many consumer applications. These products are used in applications such as clothing, toys, novelty items, fire protection products, emergency products, safety products, sporting goods such as diving sticks, plastic tubing, stationary, signs, military applications, synthetic leathers, construction uses such as bridges and monuments, outdoor decoration and the like. Generally, when a phosphorescent pigment is incorporated in a synthetic resin, the phosphorescent pigment is not easily dispersed uniformly in the synthetic resin and the resultant phosphorescent synthetic resin inevitably emits light of uneven color.

One well-known method for providing glow in the dark or fluorescence properties is zinc sulfide phosphorescent phosphor (ZnS:Cu). Zinc sulfide phosphorescent phosphor is decomposed by ultraviolet radiation in the presence of moisture and thus blackens or reduces the luminance thereof Therefore, it is difficult to use this phosphorescent phosphor in fields where it is placed outdoors and exposed to a direct sunlight.

Another well-known method for providing glow in the dark or fluorescence properties is found by combining zinc sulfide with radioactive substances. The radioactive substance, however, has the problem that it must be handled under a rigid standard of safety control and, moreover, the disposal of the waste arising therefrom incurs great expense. Further, when the phosphorescent pigment is incorporated into a synthetic resin in an amount sufficient to increase the fluorescence properties, the problem ensues that the resultant phosphorescent resin will not easily acquire sufficient strength necessary for a resinous product.

Another well-known method for providing glow in the dark or fluorescence properties is sulfide phosphorescent phosphors. Examples of sulfide phosphorescent phosphors include CaS:Bi (which emits light of violet blue), CaSrS:Bi (which emits light of blue), ZnS:Cu (which emits light of green) and ZnCdS:Cu (which emits light of yellow or orange). However, any of these sulfide phosphorescent phosphors is chemically unstable and shows degraded light resistance, i.e., it suffers from problems that must be solved for practical use.

Other methods for providing glow in the dark or fluorescence properties are disclosed in U.S. Pat. Nos. 5,424,006 and 5,686,022. Both the 5,424,006 and the 5,686,022 patents disclose phosphorescent phosphors which can be utilized both indoors and outdoors as a nighttime display and show extremely long afterglow characteristics. However, these phosphorescent phosphors must be incorporated into chemical hydrocarbon solvent-based systems as moisture or aqueous systems adversely affect them. These references are incorporated by reference in their entirety.

Yet another method for providing glow in the dark or fluorescence properties is an alkaline earth metal aluminate oxide europium doped which has the chemical composition of $SrO \bullet SrAl_4O_7$-Eu and is marketed under the trade name of NightLight20. NightLight20 or $SrO \bullet SrAl_4O_7$-Eu is a commercially available phosphorescent pigment. However, similar to the phosphorescent phosphors disclosed in the 5,424,006 and 5,686,022 patents, Nightlight20 is adversely affected by moisture or aqueous systems and therefor are only suitable for blending with oil based materials.

U.S. Pat. No. 5,665,793 discloses a composition where phosphorescent phosphors, such as those in the 5,424,006 and 5,686,022 patents, are combined with polyurethane resins which are water soluble, and which imparts moisture stability to the phosphorescent phosphors. As a result, this novel composition when used in water-based highway paints imparts an extended road surface life, and is environmentally friendly because it does not contaminate the surrounding environment with organic hydrocarbon products via vaporization or runoffs. However, these phosphorescent phosphor polyurethane resins are not moldable or formable as in the present invention.

U.S. Pat. 5,607,621 discloses a composition where phosphorescent phosphors, such as those in the 5,424,006 and 5,686,022 patents, are combined with synthetic resins to provide a phosphorescent synthetic resin material that possesses ample strength enough for enabling a formed article made of this material to withstand repeated use. However, these phosphorescent synthetic resin materials are not water-soluble.

U.S. Pat. Nos. 5,244,429 and 4,634,395 disclose gas barrier coating and coated elastomeric toy balloons. Although not relating to the photoluminescence art, the coatings described herein are polyvinyl alcohol based solutions. These solutions provide neither photoluminescence nor the ability to be molded. These references are incorporated by reference in their entirety.

The prior art as disclosed by the 5,424,006 and 5,686,022 patents as well as an analysis of the disclosures of Nightlight 20 teach away from using these moisture sensitive pigments in aqueous systems such as polyvinyl alcohol. Although the 5,665,793 patent discloses using these moisture sensitive pigments with a water-soluble polyurethane resin, the resulting products are not moldable. Accordingly, a continuing need exists for a moldable, non-toxic, non-radioactive, environmentally friendly photoluminescence polymers which do not require solvent based systems and that provides a uniform, bright afterglow for extended periods of time and are usable both indoors and outdoors.

SUMMARY OF THE INVENTION

An object of the present invention is to develop moldable, non-toxic, non-radioactive, environmentally safe photoluminescence polymers. A further object of the present invention is to provide commercial methods for making said photoluminescence polymers. Still a further object of the present invention is to provide methods of use for said photoluminescence polymers.

To accomplish the objects mentioned above, the present invention provides photoluminescence polymers obtained by having one or more phosphorescent pigments dispersed in polyvinyl alcohol aqueous solutions in ratios from about 2:1 to 1:5 by weight.

DETAILED DESCRIPTION OF THE PREFERRED EMBODIMENTS

The novel photoluminescence polymers are prepared by the steps consisting of preparing polyvinyl alcohol aqueous solution then mixing one or more of the selected photoluminescence pigments into the polyvinyl alcohol aqueous solution.

A polyvinyl alcohol aqueous solution is prepared by sprinkling polyvinyl alcohol solids into the vortex formed by rapidly stirring cold water. Rapid stirring is continued for about 10 minutes in order to thoroughly wet and disperse the solids. Heat is then supplied to warm the slurry to about 90 degrees Centigrade in order to dissolve the polyvinyl alcohol. This heating step is continued for about 4 hours or until the polyvinyl alcohol solids are completely dissolved.

The amount of polyvinyl alcohol in the solution can range from as little as about 3 percent by weight to as high as about 50 percent by weight of the total solution. Higher concentrations of polyvinyl alcohol become too viscous to allow for easy mixture of the photoluminescence pigments at room temperature. In any event, it is recognized that the concentration of polyvinyl alcohol is a function of the average molecular weight of the polyvinyl alcohol utilized and of the temperature at which the mixing of the photoluminescence pigments is desired. Higher concentrations of polyvinyl alcohol are possible when using lower molecular weight polymers or when the photoluminescence pigments mixing step occurs at an elevated temperature.

The average molecular weight of the polyvinyl alcohol can range from about 11,000 to about 186,000. The preferred embodiment is a polyvinyl alcohol having an average molecular weight of 124,000 to 186,000 and used at a concentration of about 10 to 15, percent by weight. Although the preferred embodiment employs a polyvinyl alcohol which is about 87.0 to 89.0 percent hydrolyzed, other polyvinyl alcohols having a degree of hydrolysis up to over 99 percent can be used.

The term "polyvinyl alcohol" as used throughout the specification refers to water soluble polyhydroxy compounds which can be generally characterized, for instance, by the presence of ($-CH_2-CHOH-$) units in the polymer chain. The term "polyvinyl alcohol" is also intended herein to include suitable derivatives of the water-soluble polyhydroxy compounds mentioned above, particularly those in which some of the hydroxyl groups are acetylated. These polymers are ordinarily prepared by the replacement of the acetate groups of polyvinyl acetate with hydroxyl groups as by, for example, hydrolysis or alcoholysis. The percent of acetate groups replaced by hydroxyl groups is the degree of hydrolysis of the polyvinyl alcohol thus formed and indicates the percent of hydroxyl groups present in the polyvinyl alcohol out of the total possible hydroxyl groups. This invention relates to polyvinyl alcohols with a degree of hydrolysis above about 85 percent.

It will be appreciated by those skilled in the art that polyvinyl alcohol as discussed herein includes those polyvinyl alcohols, chemically modified, altered or otherwise, that can be used in accordance with the teachings of the present invention. For example, water resistance of the dried polyvinyl alcohol film can be enhanced by the addition of organic materials that are aldehydes or aldehyde donors to the aqueous liquids.

In another example, the polyvinyl alcohols may be partially etherified by reaction with alkaline oxides.

In yet another example, the hydroxyl groups on the polyvinyl alcohol backbone in general may be partially reacted to form, for example, ethers, esters, acetals, and/or ketals using techniques well known in the art. It is intended that those suitable derivatives of these and the above polyvinyl alcohol derivatives so obtained and the like are within the scope of the present invention.

It should be clear that other ingredients could be added to the novel photoluminescence polymers without substantially altering the manner in which it functions to obtain the desired result. For example, the formation of undesirable gel in the novel photoluminescence polymers prior to addition of pigments and molding into desired shapes can be inhibited through the addition of up to 0.3 percent by weight "Triton" X-100.™. (Rohm & Haas Co.). The viscosity of the novel photoluminescence polymers can be lowered somewhat by the addition of up to 3 percent by weight of hydrogen peroxide to aid in the molding process. One or more photoluminescence pigments are then mixed into the polyvinyl alcohol aqueous solution as prepared above.

The photoluminescence pigments that may be added to the polyvinyl alcohol aqueous solution to form the novel photoluminescence polymers are selected from the group consisting $SrO\bullet SrAl_4O_7$-Eu, a matrix $MAl_2O_4$ in which M is at least one metal element selected from the group consisting of calcium, strontium and barium; and a matrix $MAl_2O_4$ in which M is a plurality of metal elements comprised of magnesium and at least one element selected from the group consisting of calcium, strontium and barium. The matrix $MAl_2O_4$ further contains europium as an activator in which the concentration of the activator is from about 0.001 mol % to about 20 mol %, the mol % being relative to the metal element expressed by M. The matrix $MAl_2O_4$ further contains a co-activator selected from the group consisting of lanthanum, cerium, praseodymium, neodymium, samarium, gadolinium, terbium, dysprosium, holmium, erbium, thulium, ytterbium, lutetium, manganese, tin and bismuth in which the concentration of the co-activator is from about 0.001 mol % to about 20 mol %, the mol % being relative to the metal element expressed by M.

The one or more of the photoluminescence pigments can be added in ratios ranging from about 2:1, 1:1, 1:2, 1:3, 1:4, or 1:5, preferably 1:1, of the total weight of the polyvinyl alcohol solution to the weight of the photoluminescence pigments. If the content of the selected pigment is less than a ratio of 2:1, the luminescence of the produced photoluminescence polymers will not be sufficient because the amount of the photoluminescence pigment is unduly small and will not be easily perceived visually in the dark. Conversely, if the content exceeds a ratio of 1:5 by weight, although providing sufficient luminance, the unduly large amount of the pigment will impair the dispersibility of the pigment in the polymers and make the product too expensive to commercialize.

In the incorporation of photoluminescence pigments possessing such outstanding photoluminescence properties as mentioned above into the novel photoluminescence polymer, it is necessary that due consideration be given to enabling the pigment to manifest the properties fully and, at the same time, avoid impairing the physical properties of the polymers themselves. For instance, maintaining the crystalline structure is necessary to maximize the luminescence from the contemplated photoluminescence pigments. The mixture of the pigments with the polyvinyl alcohol aqueous solution does not disturb this crystalline structure, thus maximizing luminescence.

It will be appreciated by those skilled in the art that the photoluminescence polymers according to the present invention produced as described herein can be incorporated into any of the uses for polyvinyl alcohol polymers to provide luminescent properties. For instance, the photoluminescence polymers according to the present invention can be manufactured into formed articles or molded articles of a desired shape by many molding methods such as, for example, injection molding, extrusion molding, transfer molding, compression molding and the like. It can be sprayed into films for making balloons, bags, coatings, bottles, containers and the like.

Since the photoluminescence polymers of the present invention have the selected pigments uniformly dispersed in the polymer as described above, it provides uniform high luminance for a long time in the absence of light. Further, the photoluminescence polymers of the present invention are minimally deteriorated by ultraviolet light and as such can be used either indoors or outdoors with improved durability.

Additionally, water-based-coloring agents can be added in varying amounts to change the color of the photoluminescence polymers of the present invention. The water-based-coloring agents may be added to the polyvinyl alcohol before the addition of the photoluminescence pigments.

The texture of the photoluminescence polymers of the present invention may also be varied. The addition of sand and the like can be blended into the photoluminescence polymers to give the final product a textured surface. The contemplated texturing agents include those selected from the group consisting of natural texturing material and synthetic texturing material.

Alternately, the novel photoluminescence polymers may also be prepared by the steps consisting of mixing polyvinyl alcohol solids with one or more of the photoluminescence pigments in solid form in the ratios described above. Then the polyvinyl alcohol-photoluminescence pigment mixture is hydrated as described above.

Although only a few exemplary embodiments of the present invention have been described in detail above, those skilled in the art will readily appreciate that many modifications and substitutions are possible in the exemplary embodiments without materially departing from the novel teachings and advantages of the invention. Accordingly, all such modifications and substitutions are intended to be included within the scope of the invention as defined in the following claims.

What is claimed is:

1. A photoluminescence polymer composition comprising water, polyvinyl alcohol, and one or more photoluminescence pigments selected from the group consisting of:
   a matrix $MAl_2O_4$ in which M is at least one metal element selected from the group consisting of calcium, strontium and barium; and
   a matrix $M'Al_2O_4$ in which M' is a plurality of metal elements comprised of magnesium and at least one element selected from the group consisting of calcium, strontium and barium.

2. The photoluminescence polymer composition of claim 1 wherein said pigment further contains europium as an activator and the concentration of the activator is from about 0.001 mol % to about 20 mol %, the mol % being relative to the metal element expressed by M or M'.

3. The photoluminescence polymer composition of claim 2 containing a co-activator selected from the group consisting of lanthanum, cerium, praseodymium, neodymium, samarium, gadolinium, terbium, dysprosium, holmium, erbium, thulium, ytterbium, lutetium, manganese, tin and bismuth, wherein the concentration of the co-activator is from about 0.001 mol % to about 20 mol %, the mol % being relative to the metal element expressed by M or M'.

4. The photoluminescence polymer composition claimed in claim 1 wherein said polyvinyl alcohol has an average molecular weight of 11,000 to 186,000.

5. The photoluminescence polymer composition claimed in claim 1 wherein said water and said polyvinyl alcohol form an aqueous solution polyvinyl alcohol that has a concentration of polyvinyl alcohol from about 3% to about 50% by weight.

6. The photoluminescence polymer composition claimed in claim 1 wherein said water and said polyvinyl alcohol form an aqueous solution polyvinyl alcohol that has a concentration of polyvinyl alcohol from about 10% to about 15% by weight.

7. The photoluminescence polymer composition claimed in claim 1 wherein said one or more photoluminescence pigments are in the ratios from 1:2 to 5:1 by weight to the weight of said aqueous solution polyvinyl alcohol.

8. The photoluminescence polymer composition claimed in claim 1 wherein said one or more photoluminescence pigments are in the ratio of 1:1 by weight to the weight of said aqueous solution polyvinyl alcohol.

9. The photoluminescence polymer composition claimed in claim 1, further comprising one or more water-based-coloring agents.

10. The photoluminescence polymer composition claimed in claim 1, further comprising one or more texturing agents selected from the group consisting of natural texturing material and synthetic texturing material.

11. A method of producing a photoluminescence polymer, comprising the steps of:
   preparing an aqueous solution of polyvinyl alcohol by mixing polyvinyl alcohol solids into cold water;
   mixing is continued to thoroughly wet and disperse said polyvinyl alcohol solids to form a slurry;
   heat is then supplied to the slurry to dissolve said polyvinyl alcohol solids;
   heating step is continued until said polyvinyl alcohol solids are completely dissolved to form said aqueous solution of polyvinyl alcohol; and
   mixing into said aqueous solution of polyvinyl alcohol one or more photoluminescence pigments selected from the group consisting of:
      a matrix $MAl_2O_4$ in which M is at least one metal element selected from the group consisting of calcium, strontium and barium; and
      a matrix $M'Al_2O_4$ in which M' is a plurality of metal elements comprised of magnesium and at least one element selected from the group consisting of calcium, strontium and barium
   to form said photoluminescence polymer.

12. The method of claim 11 wherein said pigment further contains europium as an activator and the concentration of the activator is from about 0.001 mol % to about 20 mol %, the mol % being relative to the metal element expressed by M or M'.

13. The method of claim 12 containing a co-activator selected from the group consisting of lanthanum, cerium, praseodymium, neodymium, samarium, gadolinium, terbium, dysprosium, holmium, erbium, thulium, ytterbium, lutetium, manganese, tin and bismuth, wherein the concentration of the co-activator is from about 0.001 mol % to about 20 mol %, the mol % being relative to the metal element expressed by M or M'.

14. A formed article of photoluminescence polymer obtained by forming the photoluminescence polymer as set forth in claim 1 into a formed article.

15. The formed article according to claim 14, obtained by subjecting said photoluminescence polymer to molding a molding process selected from the group consisting of injection molding, extrusion molding, transfer molding, and compression molding.

16. The formed article according to claim 14, obtained by spray-drying.

* * * * *